(12) United States Patent
Litwin et al.

(10) Patent No.: US 7,726,127 B2
(45) Date of Patent: Jun. 1, 2010

(54) SOLAR POWER FOR THERMOCHEMICAL PRODUCTION OF HYDROGEN

(75) Inventors: Robert Z. Litwin, Canoga Park, CA (US); Stanley M. Pinkowski, Simi Valley, CA (US)

(73) Assignee: Pratt & Whitney Rocketdyne, Inc., Canoga Park, CA (US)

( * ) Notice: Subject to any disclaimer, the term of this patent is extended or adjusted under 35 U.S.C. 154(b) by 217 days.

(21) Appl. No.: 11/788,283

(22) Filed: Apr. 19, 2007

(65) Prior Publication Data

US 2008/0256952 A1 Oct. 23, 2008

(51) Int. Cl.
*B60K 16/00* (2006.01)
(52) U.S. Cl. ............... 60/641.8; 60/641.11; 60/641.15
(58) Field of Classification Search ............ 60/641.8, 60/641.9, 641.11, 641.15
See application file for complete search history.

(56) References Cited

U.S. PATENT DOCUMENTS

| | | | |
|---|---|---|---|
| 3,919,406 A | | 11/1975 | Grimes et al. |
| 4,314,984 A | * | 2/1982 | Frosch et al. ............ 423/579 |
| 4,319,626 A | * | 3/1982 | Papazian et al. ....... 165/104.12 |
| 4,668,494 A | | 5/1987 | Van Hook |
| 4,799,357 A | | 1/1989 | Hanrahan |
| 5,833,834 A | | 11/1998 | Hanrahan et al. |
| 6,279,321 B1 | * | 8/2001 | Forney ................... 60/641.11 |
| 2004/0099261 A1 | * | 5/2004 | Litwin .................... 126/638 |
| 2004/0244376 A1 | * | 12/2004 | Litwin et al. .............. 60/641.8 |
| 2005/0126170 A1 | * | 6/2005 | Litwin .................... 60/641.8 |
| 2006/0002845 A1 | | 1/2006 | Lahoda et al. |
| 2006/0188433 A1 | | 8/2006 | Weimer et al. |
| 2008/0000231 A1 | | 1/2008 | Litwin et al. |

FOREIGN PATENT DOCUMENTS

EP 1873397 A2 2/2008
JP 55067503 A 5/1980

OTHER PUBLICATIONS

Perret, R.; Chen, Y.; Besenbruch, G.; Diver, R.; Weimer, A.; Lewandowski, A.; and Miller, E. High-Temperature Thermochemical, *DOE Hydrogen Program—FY 2005 Progress Report*, Oct. 2004.
Giaconia, A. et al., "Hydrogen/methonol production by sulfur-iodine thermochemical cycle powered by combined solar/fossil energy," International Journal of Hydrogen Energy vol. 32, pp. 469-481, Jul. 25, 2006.
Copeland, Robert J. et al., "High temperature molten salt solar thermal systems," Proceedings of the Intersociety Energy Conversion Engineering Conference vol. 4, No. 17, pp. 2032-2036, Jan. 1, 1982.
Official Search Report of the European Patent Office in counterpart foreign Application No. 08251109 filed Mar. 27, 2008.

* cited by examiner

*Primary Examiner*—Hoang M Nguyen
(74) *Attorney, Agent, or Firm*—Kinney & Lange, P.A.

(57) ABSTRACT

A solar-powered hydrogen production system includes a thermochemical system and solar heating system. The thermochemical system produces hydrogen. The solar heating system has a molten salt heat transfer medium for providing thermal energy to the thermochemical system.

16 Claims, 2 Drawing Sheets

SOLAR POWER FOR THERMOCHEMICAL PRODUCTION OF HYDROGEN

BACKGROUND OF THE INVENTION

The present invention relates generally to hydrogen production systems. In particular, the invention relates to a hydrogen production system powered by a renewable energy source.

There is a continuing demand for clean renewable energy sources due to the depletion of the Earth's supply of fossil fuels and concerns over their contribution to global warming. Hydrogen promises to be a clean fuel that can be produced by renewable energy as a fossil fuel replacement. Hydrogen can readily be used in many industrial applications, such as internal combustion engines with little engine modification, in fuel cells to generate electricity, or in power plants to generate electricity.

Hydrogen is currently primarily produced from methane through steam methane reforming. However, steam methane reforming results in a net loss of total energy and the release of pollution. Another hydrogen production method uses coal in a gasification process. While depletion of coal is not an immediate concern, the gasification of coal has other disadvantages, including: high plant capital costs, plant availability, coal mining, coal transportation, and various forms of pollution. There are also processes using renewable sources to provide energy for hydrogen production. For example, it is also widely known that solar energy can be used to generate electricity that can be used to create hydrogen from water through electrolysis. Solar energy can also be used to generate hydrogen when coupled to a high temperature thermochemical process such as sulfur-iodine.

Another method of producing hydrogen is through a low temperature thermochemical process. One such process is the "copper chloride" thermochemical process. The first reaction in this process is given below:

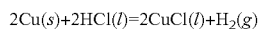

Due to the concern of depleting natural resources and the effect of pollution on global warming, there is a need in the art for a method of producing hydrogen using renewable resources.

BRIEF SUMMARY OF THE INVENTION

A solar-powered hydrogen production system includes a thermochemical system and solar heating system. The thermochemical system produces hydrogen. The solar heating system has a molten salt heat transfer medium for providing thermal energy to the thermochemical system.

DETAILED DESCRIPTION

Figure 1:
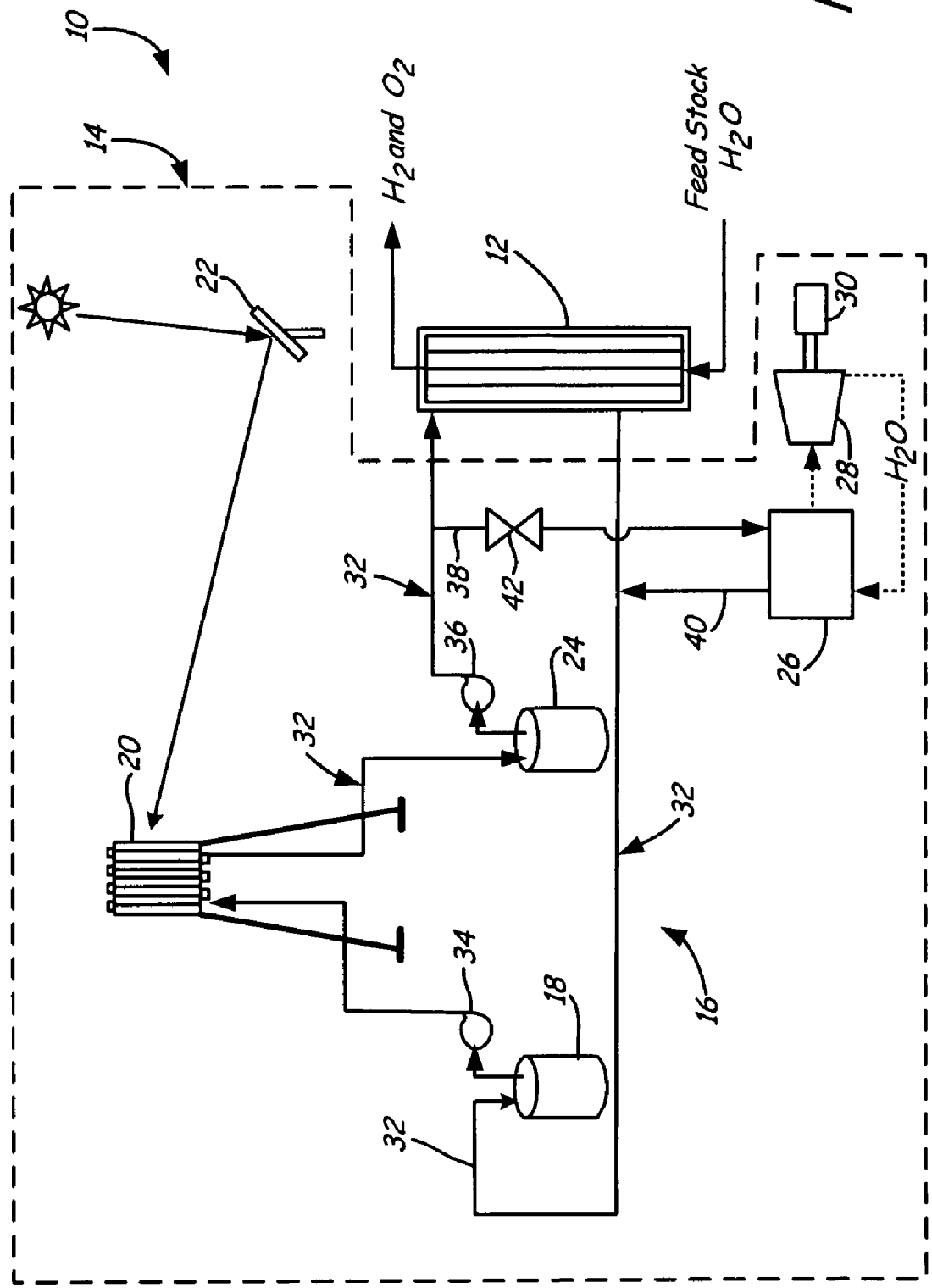
FIG. 1 is a schematic of a solar-powered hydrogen production system.

FIG. 1 shows a schematic of solar-powered hydrogen production system 10, which generally includes thermochemical system 12 and solar heating system 14. Thermochemical system 12 provides a low temperature process of producing hydrogen, eliminating the need for high temperature refractory materials and high concentrating solar thermal plant designs. Solar heating system 14 is capable of providing thermal and electrical energy to thermochemical system 12 up to 24 hours a day. The continuous use of thermochemical system 12 and solar heating system 14 in conjunction with one another allows for efficient use of thermochemical system 12 by avoiding restart problems and thermal transients. This increases the overall efficiency and asset utilization of solar-powered hydrogen production system 10, improving operating economics.

Thermochemical system 12 uses a copper chloride (CuCl) thermochemical cycle to produce hydrogen. The addition of several other steps allows for the production of oxygen and complete recycling of the CuCl. As described above, the CuCl thermochemical cycle is a low temperature thermochemical cycle.

Solar heating system 14 generally includes circulation system 16, cold storage tank 18, solar receiver 20, heliostats 22, hot storage tank 24, steam generator 26, turbine 28, and generator 30. Circulation system 16 transports a heat transfer medium through solar heating system 14 and generally includes primary line 32, cold pump 34, hot pump 36, side stream 38, recycle line 40, and valve 42. Primary line 32 carries the heat transfer medium from cold storage tank 18 to solar receiver 20, to hot storage tank 24, to thermochemical system 12, and back to cold storage tank 18 in a closed loop. The heat transfer medium is pumped through primary line 32 by cold pump 34 and hot pump 36. The heat transfer medium may also be pumped through side stream 38 to steam generator 26 and back through recycle line 40.

In operation, the heat transfer medium is stored in cold storage tank 18.

When needed, the heat transfer medium is pumped through cold pump 34 to solar receiver 20, which is typically positioned 50 feet to 250 feet or more above ground. Heliostats 22 redirect and concentrate solar radiation from the sun onto solar receiver 20, which converts the redirected sunlight to thermal energy. The heat transfer medium flows through receiver tubes of solar receiver 20 where it is heated by the concentrated solar energy. Solar receiver 20 is capable of withstanding temperatures of at least approximately 590° C.

After the heat transfer medium has been heated in solar receiver 20 to the desired temperature, the heat transfer medium is stored in hot thermal storage tank 24 until it is needed by thermochemical system 12. Hot thermal storage tank 24 provides hot molten salt for hydrogen and electricity production that is not necessarily concurrent with the availability of sunlight.

When thermal energy is needed, the heated heat transfer medium is pumped from hot thermal storage tank 24 and circulated through thermochemical system 12. Solar heating system 14 is thus used in conjunction with thermochemical system 12 to produce hydrogen by providing thermal energy.

After the heat transfer medium has passed through thermochemical system 12, the extracted thermal energy from the heat transfer medium results in a drastic drop in the heat transfer medium temperature and it is sent back to cold storage tank 18, where it is stored for reuse in closed cycle solar heating system 14 until needed.

The heat transfer medium can be any medium that has the capability to transfer heat and thermally maintain the heat in the medium, such as liquid metal or molten salt. In an exemplary embodiment, molten salt is used as the heat transfer medium through solar heating system 14. The molten salt used to transfer heat from solar receiver 20 to thermochemical system 12 is capable of being heated to a temperature of at least approximately 590° C. The molten salt can be salts composed of a eutectic mixture of sodium nitrate and potassium nitrate. A suitable composition of the molten salt is between approximately 40% and approximately 60% sodium nitrate by weight and approximately 40% and approximately 60% potassium nitrate by weight. A more suitable composition of the molten salt is approximately 50% sodium nitrate by weight and approximately 50% potassium nitrate by weight.

Solar hydrogen production system 10 may also optionally include steam generator 26, turbine 28, and electric generator 30. The complete set of reactions produce hydrogen, oxygen, and recycle CuCl:

$$2Cu(s)+2HCl(l)=2CuCl(l)+H_2(g)$$

$$2CuCl(s)=2CuCl_2(aq)+2(Cu)$$

$$2CuCl_2(s)+H_2O(g)=CuO*CuCl_2(s)+2HCl(g)$$

$$CuO*CuCl_2(s)=2CuCl(l)+\tfrac{1}{2}O_2(g)$$

For the hydrogen production reaction (a), a temperature of between approximately 430 degrees Celsuis (° C.) to approximately 475° C. is required to initiate the reaction.

Reaction (b) requires a temperature of between approximately 25° C. to approximately 75° C.; reaction (c) requires a temperature of between approximately 350° C. to approximately 400° C.; and oxygen production reaction (d) requires a temperature of approximately 530° C. The heated heat transfer medium of solar heating system 14 can also be used to provide the electrical energy necessary in the CuCl thermochemical process.

In this case, the heated heat transfer medium can be diverted through side stream 38 to steam generator 26. Valve 42 is positioned at side stream line 38 and can be switched between a closed position and an open position to either prevent or allow, respectively, the flow of the heated heat transfer medium to steam generator 26. If valve 42 is in the open position, the heated heat transfer medium is allowed to pass through steam generator 26 to generate steam to power turbine 28. In turn, turbine 28 drives generator 30 to produce electricity. The electrical energy can then be provided to the CuCl thermochemical process or used for any other purpose. After the heated heat transfer medium has been depleted of its heat, it is sent back to cold storage tank 18 through recycle line 40, where it is stored until it is needed.

Figure 2:
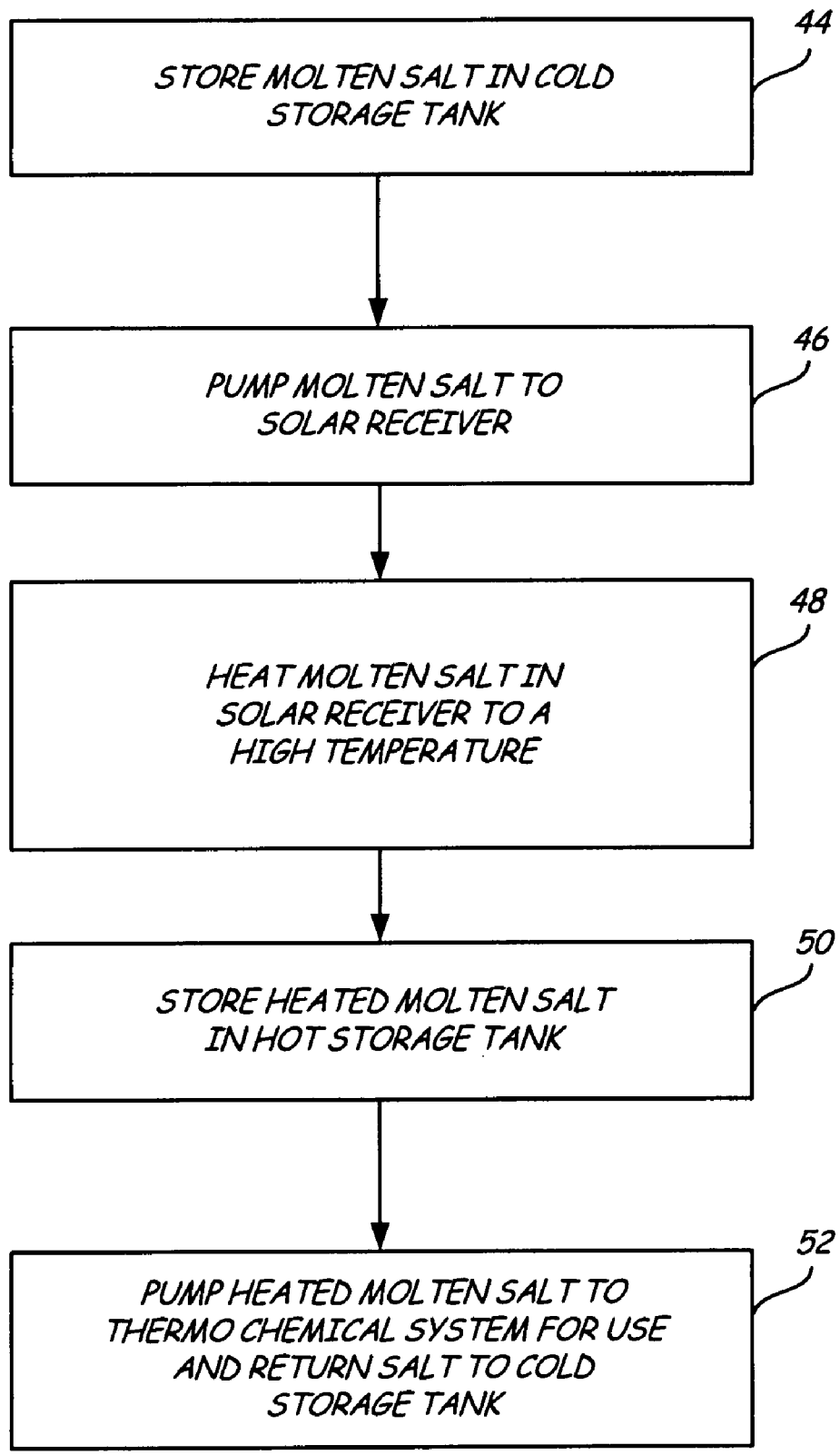
FIG. 2 is a diagram of a method of using molten salt as the heat transfer medium of the solar-powered hydrogen production system.

FIG. 2 shows a diagram of a method of using the heat transfer medium from solar heating system 14 to provide thermal and electrical energy to thermochemical system 12. As previously mentioned, the molten salt is initially stored in cold storage tank 18, Box 44. When needed, the molten salt is pumped to solar receiver 20 (Box 46) and heated to a temperature of at least approximately 590° C., Box 48. As shown in Box 50, the heated molten salt is then sent to hot storage tank 24 until it is needed by thermochemical system 12. The heated molten salt is pumped to thermochemical system 12, where the thermal energy from the molten salt is used to power thermochemical system 12, Box 52.

The solar hydrogen production system uses a solar heating system in combination with a thermochemical system to produce hydrogen and oxygen. The thermochemical system uses copper chloride to produce hydrogen and oxygen at temperatures of approximately 590° C. The solar heating system circulates molten salt as a heat transfer medium to transport the thermal energy required to initiate the hydrogen production reaction in the thermochemical system. In an exemplary embodiment, the solar heating system is a solar power tower system that heats the molten salt to a temperature of approximately 590° C. Additionally, the solar heating system may also provide electrical energy to the thermochemical cycle or other uses.

Although the present invention has been described with reference to preferred embodiments, workers skilled in the art will recognize that changes may be made in form and detail without departing from the spirit and scope of the invention.

The invention claimed is:

1. A solar-powered hydrogen production system, the system comprising:
   a low temperature thermochemical system using a copper chloride thermochemical cycle for producing hydrogen with a maximum reaction temperature of about 530° C.; and
   a solar heating system having a molten salt heat transfer medium for providing thermal energy to the thermochemical system;
   wherein the copper chloride thermochemical cycle for producing hydrogen comprises the following set of chemical reactions and reaction temperatures:
   $2Cu(s)+2HCl(l)=2CuCl(l)+H_2(g)$ at a temperature of between about 430° C. to about 475° C.;
   $2CuCl(s)=2CuCl_2(aq)+2Cu$ at a temperature of between about 25° C. to about 75° C.;
   $2CuCl_2(s)+H_2O(g)=CuO*CuCl_2(s)+2HCl(g)$ at a temperature of between about 350° C. to about 400° C.; and
   $CuO*CuCl_2(s)=2CuCl(l)+\tfrac{1}{2}O_2(g)$ at a temperature of about 530° C.

2. The solar-powered hydrogen production system of claim 1, wherein the molten salt heat transfer medium comprises about 60% sodium nitrate and about 40% potassium nitrate.

3. The solar-powered hydrogen production system of claim 1, wherein the solar heating system provides thermal energy for generating electrical energy that is supplied to the thermochemical system.

4. The solar-powered hydrogen production system of claim 3, wherein the thermochemical system also produces oxygen.

5. A system comprising:
   a low temperature thermochemical system using a copper chloride thermochemical cycle for producing hydrogen with a maximum reaction temperature of about 530° C.;
   a molten salt heat transfer medium for providing thermal energy to the low temperature thermochemical system; and
   a solar receiver for heating the heat transfer medium;
   wherein the copper chloride thermochemical cycle for producing hydrogen comprises the following set of chemical reactions and reaction temperatures:
   $2Cu(s)+2HCl(l)=2CuCl(l)+H_2(g)$ at a temperature of between about 430° C. to about 475° C.;
   $2CuCl(s)=2CuCl_2(aq)+2Cu$ at a temperature of between about 25° C. to about 75° C.;
   $2CuCl_2(s)+H_2O(g)=CuO*CuCl_2(s)+2HCl(g)$ at a temperature of between about 350° C. to about 400° C.; and
   $CuO*CuCl_2(s)=2CuCl(l)+\tfrac{1}{2}O_2(g)$ at a temperature of about 530° C.

6. The system of claim 5, wherein the heat transfer medium comprises molten salt.

7. The system of claim 6, wherein the molten salt comprises about 60% sodium nitrate and about 40% potassium nitrate.

8. The system of claim 6, wherein the heat transfer medium provides thermal energy to the thermochemical process.

9. The system of claim 6, wherein the heat transfer medium is used to generate electrical energy for use in the thermochemical process.

10. The system of claim 6, wherein the system is a solar heating system.

11. A method comprising:
capturing solar energy from sunlight;
heating a heat transfer medium with the solar energy;
transporting the heat transfer medium to a hydrogen and oxygen production system; and
generating hydrogen and oxygen with the hydrogen and oxygen production system with a maximum reaction temperature of about 530° C.; wherein the hydrogen and oxygen production system is a copper chloride thermochemical cycle comprising the following set of chemical reactions and reaction temperatures:

$2Cu(s)+2HCl(l)=2CuCl(l)+H_2(g)$ at a temperature of between about 430° C. to about 475° C.;

$2CuCl(s)=2CuCl_2(aq)+2Cu$ at a temperature of between about 25° C. to about 75° C.;

$2CuCl_2(s)+H_2O(g)=CuO*CuCl_2(s)+2HCl(g)$ at a temperature of between about 350° C. to about 400° C.; and $CuO*CuCl_2(s)=2CuCl(l)+\frac{1}{2}O_2(g)$ at a temperature of about 530° C.

12. The method of claim 11, wherein capturing solar energy comprises using a solar heating system.

13. The method of claim 11, the heat transfer medium comprises molten salt.

14. The method of claim 13, wherein the molten salt comprises about 60% sodium nitrate and about 40% potassium nitrate.

15. The method of claim 13, wherein transporting the molten salt to the low temperature hydrogen and oxygen production system comprises providing at least one of thermal energy and electrical energy to the hydrogen and oxygen production system.

16. The method of claim 11, wherein the heat transfer medium provides thermal energy to the hydrogen and oxygen production system.

* * * * *